United States Patent
Paradie

(10) Patent No.: US 7,409,295 B2
(45) Date of Patent: Aug. 5, 2008

(54) IMMINENT-COLLISION DETECTION SYSTEM AND PROCESS

(75) Inventor: Michael John Paradie, Nashua, NH (US)

(73) Assignee: M/A-Com, Inc., Lowell, MA (US)

( * ) Notice: Subject to any disclaimer, the term of this patent is extended or adjusted under 35 U.S.C. 154(b) by 263 days.

(21) Appl. No.: 10/914,360

(22) Filed: Aug. 9, 2004

(65) Prior Publication Data

US 2006/0031015 A1 Feb. 9, 2006

(51) Int. Cl.
*G01S 13/93* (2006.01)
*B60T 7/22* (2006.01)
*B60W 30/08* (2006.01)

(52) U.S. Cl. .......................................... 701/301; 701/45

(58) Field of Classification Search ................. 701/301, 701/45–47
See application file for complete search history.

(56) References Cited

U.S. PATENT DOCUMENTS

| | | | | |
|---|---|---|---|---|
| 5,341,142 A * | 8/1994 | Reis et al. | | 342/64 |
| 5,537,119 A * | 7/1996 | Poore, Jr. | | 342/96 |
| 5,540,298 A * | 7/1996 | Yoshioka et al. | | 180/169 |
| 5,572,428 A * | 11/1996 | Ishida et al. | | 701/301 |
| 5,613,039 A * | 3/1997 | Wang et al. | | 706/24 |
| 5,959,574 A * | 9/1999 | Poore, Jr. | | 342/96 |
| 6,301,542 B1 * | 10/2001 | Kirchberger et al. | | 701/93 |
| 6,404,380 B2 * | 6/2002 | Poore, Jr. | | 342/96 |
| 6,420,997 B1 * | 7/2002 | Cong | | 342/70 |
| 6,470,272 B2 * | 10/2002 | Cong et al. | | 701/301 |
| 6,526,373 B1 * | 2/2003 | Barral | | 703/6 |
| 6,691,034 B1 * | 2/2004 | Patera et al. | | 701/301 |
| 6,820,006 B2 * | 11/2004 | Patera | | 701/301 |
| 6,917,855 B2 * | 7/2005 | Gonzalez-Banos et al. | | 700/245 |
| 7,124,027 B1 * | 10/2006 | Ernst et al. | | 701/301 |
| 2002/0008657 A1 * | 1/2002 | Poore, Jr. | | 342/96 |
| 2002/0019697 A1 * | 2/2002 | Cong et al. | | 701/207 |
| 2002/0044081 A1 * | 4/2002 | Cong | | 342/70 |
| 2002/0091479 A1 * | 7/2002 | Maruko et al. | | 701/96 |

(Continued)

FOREIGN PATENT DOCUMENTS

EP 1 273 930 A1 1/2003

(Continued)

OTHER PUBLICATIONS

Likelihood-ratio test. From Wikipedia, the free encyclopedia. Revision as of 15:23, Aug. 4, 2006; http://en.wikipedia.org/w/index.php?title=Likelihood-ratio_test&oldid=67648965&printable=yes Downloaded: Aug. 15, 2006 12:39:42 PM.*

(Continued)

*Primary Examiner*—Deandra M. Hughes
*Assistant Examiner*—Ari M Diacou

(57) ABSTRACT

A process of determining an imminent-collision between a vehicle and an object, said vehicle having a sensing system for obtaining one or more images representing at least one observed object within a field of detection, said process comprising: (a) obtaining one or more images representing an observed object within said field of detection; and (b) determining that a collision between said vehicle and said observed object is imminent when the ratio of the probability that said observed object is actually within a collision zone to the probability that said observed object is actually within a safe zone is greater than a certain value.

24 Claims, 8 Drawing Sheets

U.S. PATENT DOCUMENTS

| | | | |
|---|---|---|---|
| 2003/0055563 A1* | 3/2003 | Jonas Lars et al. | 701/301 |
| 2003/0139883 A1* | 7/2003 | Takafuji et al. | 701/301 |
| 2003/0146869 A1* | 8/2003 | Lin et al. | 342/357.14 |
| 2004/0024527 A1* | 2/2004 | Patera | 701/301 |
| 2004/0024528 A1* | 2/2004 | Patera et al. | 701/301 |
| 2004/0059548 A1* | 3/2004 | Kagarlis | 703/2 |
| 2004/0073368 A1* | 4/2004 | Gonzalez-Banos et al. | 701/301 |
| 2005/0179580 A1* | 8/2005 | Cong et al. | 342/70 |
| 2005/0216181 A1* | 9/2005 | Estkowski et al. | 701/200 |
| 2005/0225477 A1* | 10/2005 | Cong et al. | 342/70 |
| 2005/0261886 A1* | 11/2005 | Kagarlis | 703/22 |
| 2007/0027612 A1* | 2/2007 | Barfoot et al. | 701/117 |

FOREIGN PATENT DOCUMENTS

WO      WO 03/096068 A1     11/2003

OTHER PUBLICATIONS

Romeau, Jorge Luis. Understanding Binomial Sequence Testing. START: Selected Topics in Assurance Related Technologies. vol. 12, No. 2. Published by the Reliability Analysis Center.*

A retrospective detection algorithm for extraction of weak targets in clutter and interference environments. Prengaman, R. J.; Thurber, R. E.; Bath, W. G. Radar-82; Proc. of the Itnl. Conf., London, England, Oct. 18-20, 1982 (A84-10751 01-32). London, Institution of Electrical Engineers, 1982, p. 341-345.*

Likelihood principle. From Wikipedia, the free encyclopedia. Revision as of 18:55, Jul. 5, 2006; http://en.wikipedia.org/w/index.php?title=Likelihood_principle&oldid=62230385&printable=yes DL: Aug. 17, 2006 11:50:38 AM.*

Likelihood function. From Wikipedia, the free encyclopedia. Revision as of 21:02, Jul. 22, 2006; http://en.wikipedia.org/w/index.php?title=Likelihood_function=oldid=65267664&printable=yes DL: Aug. 17, 2006 11:51:19 AM.*

Bayesian model comparison. From Wikipedia, the free encyclopedia. Revision as of 15:48, Aug. 10, 2006; http://en.wikipedia.org/w/index.php?title=Bayesian_model_comparison&oldid=68833451&printable=yes DL: Aug. 17, 2006 11:59:40 AM.*

Bayesian Sequential Analysis. "Introduction to Bayesian Statistics", by Harvey Thornburg ( Music 423 Apr. 27, 2001, CCRMA, Stanford University, Spring 2000-2001). Copyright © Feb. 19, 2006 by Harvey Thornburg. http://ccrma.stanford.edu/~jos/bayes/Bayesian_Sequential_Analysis.html.*

Wald, A., Sequential Analysis, John Wiley, New York (1947).*

Uitenbroek, Daan G. "Wald's Sequential Probability Ratios" 1997. http://home.clara.net/sisa/sprthlp.htm (Aug. 18, 2006).*

Integrated Pest Management of Postharvest Maize in Developing Countries. Niels Holst, Richard H. Markham and William G. Meikle. Online Book, chapter 4.2: The Sequential probability ratio test. Updated: Sep. 2, 2002. http://www.agrsci.dk/plb/bembi/africa/sampling/samp_spr.html DL: Aug. 17, 2006 12:52:18 PM.*

Bayesian Statistics, A Review. D.V. Lindley. © 1972, Society for Industrial and Applied Mathematics. Printed by: JW Arrowsmith Ltd. Bristol, England. pp. 1-3, 17-32, 56-64.*

R. Parasuraman and P.A. Hancock. Using Singnal Detection Theory and Bayesian Analysis to Design Parameters fo Automated Warning Systems. Taken from: "Automation Technology and Human Perfromance: Current Research and Trends" Eds: Mark W. Scerbo and Mustapha Mouloua. © 1999 by Lawrence Erlbaum Assc., Inc., Mahwah, New Jersey. pp. 63-67.*

Huosheng Hu and Michael Brady. A Bayesian Approach to Real-Time Obstacle Avoidance for a Mobile Robot. Autunomous Robots, 1, 69-92 (1994) © 1994 Kluwer Academic Publishers, Boston. Manufactured in The Netherlands.*

Koike, C.; Pradalier, C.; Bessiere, P.; Mazer, E., "Proscriptive Bayesian programming application for collision avoidance," Intelligent Robots and Systems, 2003. (IROS 2003). Proceedings. 2003 IEEE/RSJ International Conference on , vol. 1, no., pp. 394-399 vol. 1, Oct. 27-31, 2003. URL: http://ieeexplore.ieee.org/iel5/8832/27983/01250660.pdf.*

Daniel Castro, Urbano Nunes, António Ruano. Obstacle Avoidance in Local Navigation. Proceedings of the 10th Mediterranean Conference on Control and Automation—MED2002. Lisbon, Portugal, Jul. 9-12, 2002. 10 Pages.*

W. Burgard, A.B. Cremers, D. Fox, D. Hahnel, G. Lakemeyer, D. Schulz, W. Steiner, and S. Thrun. The interactive museum tourguide robot. In Proc.of the Fifteenth National Conference on Artificial Intelligence, Madison, Wi, 1998. http://citeseer.ist.psu.edu/burgard98interactive.html.*

Dangauthier, P.; Bessieere, P.; Spalanzani, A., "Auto-supervised learning in the Bayesian Programming Framework," Robotics and Automation, 2005. ICRA 2005. Proceedings of the 2005 IEEE International Conference on , vol., no., pp. 3066-3071, Apr. 18-22, 2005. URL: http://ieeexplore.ieee.org/iel5/10495/33250/01570581.pdf.*

* cited by examiner

IMMINENT-COLLISION DETECTION SYSTEM AND PROCESS

FIELD OF INVENTION

The present invention relates generally to a process and system for detecting an imminent-collision between a vehicle and object.

BACKGROUND OF INVENTION

In the year 2000, more than 36,000 people were killed in automobile collisions in the United States. (*Traffic Safety Facts* 2000, U.S. Department of Transportation, December 2001.) Automobile manufacturers are investigating methods to reduce both the number of fatalities and the severity of injuries resulting from such collisions. Among the more promising solutions are reversible restraints and pre-triggered airbags.

Reversible restraints are activated immediately before a crash to reduce the severity of occupant injury. As the name suggests, these restraints are also capable of being reset or reinstalled quickly and inexpensively compared to, for example, air bags. Examples of reversible restraints include pre-tensioning seatbelts, drop-down knee padding, active headrests, extendable bumpers, and vehicle-structure reinforcement. Pre-triggered airbags use collision velocity data to supplement information from acceleration sensors in vehicle to estimate the kinetic energy involved in the collision. With this information, the airbags may be deployed at the optimum inflation rate and pressure, thereby enhancing their effectiveness and safety. Airbags deployed under such conditions tend to be less dangerous to children and smaller adults. As used herein, reversible restraint systems and pre-triggered air bags are referred to collectively as "collision-mitigation measures."

Although most agree that collision-mitigation measures would have a profound effect on minimizing the severity of collisions, such measures have been difficult to implement with reliability. Specifically, due to inaccuracies of commercially-available sensing systems, such as short-range radars (SRR), it is often difficult to adequately estimate the true location of an observed object, especially with respect its bearing value. It may require many observations over time in order to prepare an adequate estimate of the object's true location and velocity vector. Accordingly, there is great interest in developing a system which minimizes the number of available observations needed to make a deployment decision, while still satisfying certain quality-of-decision requirements. In particular, an imminent collision situation should be detected reliably and at the earliest possible time. Likewise, when an imminent collision situation does not exist, then the probability of falsely predicting an imminent collision should be very small. It is critical that such false positive indications are minimized since deploying collision mitigation measures mistakenly is not only inconvenient and may involve a cost to remediate, but also is distracting and thus potentially dangerous.

Therefore, there is a need for a detection system that indicates an imminent-collision not only with a high degree of accuracy with little or no chance of a false positive indication, but also quickly to provide sufficient time to effectively deploy the collision mitigation measures. The present invention fulfills this need among others.

SUMMARY OF INVENTION

The present invention provides for a system and process of detecting an imminent-collision quickly and reliably by minimizing target parameter computations and relying instead on probability density distributions to determine the likelihood of a collision. Specifically, the applicant recognizes that prior art approaches for detecting collisions which rely on calculating target parameters of the object, such as velocity and time-to-impact, require too much time for the accuracy required. To avoid this problem, the applicant applies statistical analysis to probability density distributions to determine whether an observed object is on a collision course with the vehicle. In other words, the present invention approaches the problem not by determining target parameters based upon image data, but rather by comparing the image data to known probability density distributions for objects on both collision and avoidance courses. If the probabilities are high enough that the observed object is on a collision course and not on an avoidance course, then an imminent-collision condition is indicated. Thus, by relying on probability data and statistics rather than extrapolating target parameters based on a series of observed data, one can determine very quickly an imminent-collision with a high degree of accuracy. Indeed, using this approach, one can determine whether an object is on a collision course even before its target parameters are calculated.

Accordingly, one aspect of the present invention is a process in which an imminent-collision is determined if the probability of a collision is high enough and the probability that avoidance is low enough. In a preferred embodiment, the process comprises: (a) obtaining one or more images representing an observed object within the field of detection of a sensing system on the vehicle; and (b) determining that a collision between the vehicle and the observed object is imminent when the ratio of the probability that the observed object is actually within a collision zone to the probability that the observed object is actually within a safe zone is greater than a certain value. In an alternative embodiment, the process comprises: (a) obtaining one or more images representing an observed object within the field of detection of a sensing system; and (b) before determining target parameters of the observed object, determining the likelihood that a collision between the vehicle and the observed object is imminent based upon one or more probability density distributions.

Accordingly, another aspect of the present invention is a system which obtains image data and evaluates whether the observed object is on a collision course based on the ratio of the probability that the observed object is actually within a collision zone to the probability that the observed object is actually within a safe zone. In a preferred embodiment, the system comprises a computer adapted to receive one or more image signals representing an observed object within the field of detection, the computer also being configured to determine that a collision between the vehicle and the observed object is imminent when the ratio of the probability that the observed object is actually within a collision zone to the probability that the observed object is actually within a safe zone is greater than a certain value.

Still another aspect of the present invention is a vehicle with an imminent-collision as described above. In a preferred embodiment, the vehicle comprises: (a) a sensing system for generating one or more image signals representing at least one object within a field of detection; and (b) a system for determining an imminent-collision between a vehicle and an object, the system comprising a computer adapted to receive one or more image signals representing an observed object within the field of detection, the computer also being configured to determine that a collision between the vehicle and the observed object is imminent when the ratio of the probability that the observed object is actually within a collision zone to the probability that the observed object is actually within a safe zone is greater than a certain value These probabilities are determined using knowledge of uncertainty in the image data or other known sources.

DETAILED DESCRIPTION

Figure 1:
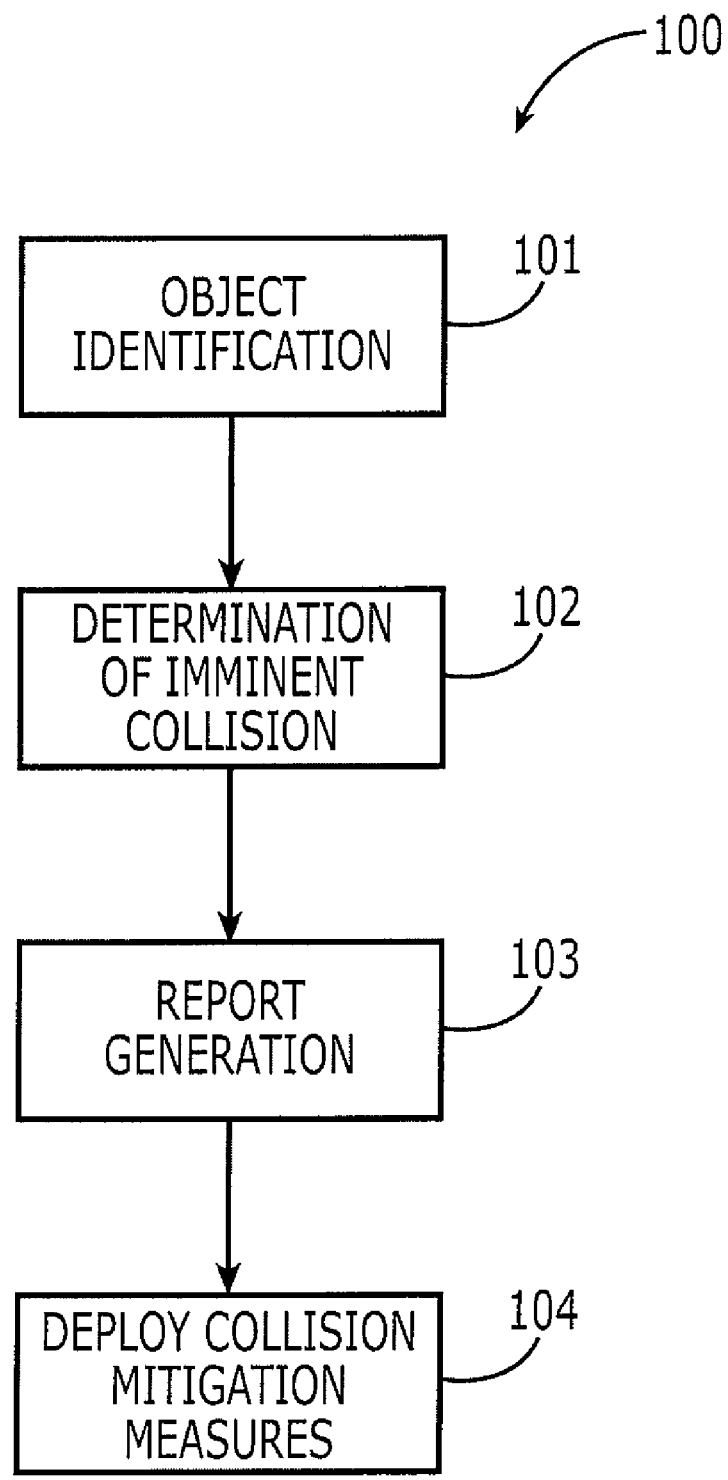
FIG. 1 shows a flow chart of a preferred embodiment of the process of the present invention.

Described herein is a system and process for determining an imminent-collision between a vehicle and an object. As used herein, the term "vehicle" refers to any primary entity that moves relative to other objects which may pose a threat to the primary entity in the event of a collision or near collision. Preferably, the vehicle carries one or more people for transportation or entertainment purposes. Examples of such vehicles include automobiles (including cars and trucks), airplanes, boats (including personal watercraft, boats, ships and submarines), and railed vehicles (including trains, trolleys and subways). It is also anticipated that the vehicle may be stationary and the objects are moving relative to it (e.g., a toll both). Preferably, the vehicle is an automobile and the present invention is described herein with respect to an automobile.

The reader should note that it is often convenient to describe the motion of objects with respect to the vehicle or sensing system. It should be appreciated that although the motion may be attributed entirely to the object, in fact, the motion may arise from the object, the vehicle (including rotation of the vehicle), or both.

As used herein, the term "imminent-collision" refers to a condition in which a collision is likely to occur before a person can take evasive measures to avoid the collision. Although the time required to take evasive measures will vary depending upon a number of variables, such as the skill of the person operating the vehicle, environmental conditions (e.g., road conditions) and relative speed between the vehicle and object, typically reaction time is no less than about 0.5 seconds.

In the preferred embodiment of the present invention, image data from a vehicle sensing system is used to determine whether an imminent-collision condition exists. As used herein, the term "sensing system" refers to any conventional or later-developed device or system which detects or senses the existence of an object in a particular field, herein, the "field of detection," and provides an electronic representation or "image" of the observed object. The image may contain state (i.e., position, velocity, etc) information about one or more observed objects at a particular instance of time. In general, this image data will have a measure of uncertainty with respect to the represented state information for each object. The sensing system may be based on, for example, echoed electromagnetic radiation (e.g. laser, radar), acoustics (e.g., sonar, ultrasound), and thermal imaging (e.g., infrared). Preferably, the detecting system is based on electromagnetic echoing, specifically, radar. In a particularly preferred embodiment, the radar is a short-range radar (SRR). Such systems are well known and the details of which will not be discussed herein in detail.

There is typically a "scan" time associated with the sensing system in which the field of detection is scanned for images at a given frequency. Thus, an observed object in the field of detection will typically be represented as a series of images over time. The collection of images over time is a typical means to reduce the uncertainty in object state below that inherent in any single image. In the preferred embodiment of the present invention, however, each image and its implied uncertainty are used to fulfill the quality requirements associated with an imminent-collision decision. In particular, an image is collected at each scan and used with images from previous scans until the object is sufficiently determined to be associated with an imminent collision, or the object exits the sensor's field of view. As will be described below, the collection of images over time also provides a means to eliminate random false objects, which may be generated by sensing systems operating at low signal-to-noise ratios.

Referring to FIG. 1, a flow chart 100 of a preferred embodiment of the process of present invention is shown. As shown, the process comprises at least steps 101 and 102. (It is worthwhile to mention that, although the invention is described herein in terms of steps, this is done to facilitate understanding and is not intended to limit the scope of the invention. Indeed, it is contemplated that the functions of one or more steps may be combined or split among other steps.) In step 101, one or more images representing an observed object within the field of detection is obtained. In one embodiment of step 102, a collision between the vehicle and the observed object is determined to be imminent when the ratio of the probability that the observed object is actually within a collision zone to the probability that the observed object is actually within a safe zone is greater than a certain value. Alternatively and/or preferably with respect to the embodiment of step 102 mentioned immediately above, the likelihood that a collision between the vehicle and the object is determined to be imminent before determining target parameters of the object. As used herein, the term "target parameters" refers to calculations derived from a series of image data relating to the observed object's position and movement relative to the vehicle, and, includes, for example, velocity, direction and time-to-impact information. In a preferred embodiment, the process of the present invention also comprises step 103, in which an imminent-collision report is generated, and step 104, in which collision mitigation measures are deployed. These steps are considered in more detail below along with a preferred system for executing these steps.

Object Identification

In step 101, one or more images representing an observed object are generated by the sensing system and this image data is transmitted to a processing unit to determine whether the observed object is on a collision course with the vehicle in step 102. As mentioned above, sensing systems may generate false signals. Therefore, in a preferred embodiment, the detection system functions to eliminate false positive signals.

One approach for eliminating false positive signals and "authenticating" an object is to compare a series of images over time to certain patterns which are consistent with actual objects. For example, in one embodiment, images of an observed object are recorded over a series of observations or scans and a search for a straight-line pattern is performed. This is a known technique and is referred to as a "retrospective detection algorithm." (See, e.g., Prengaman, et al, "A Retrospective Detection Algorithm for Extraction of Weak Targets in Clutter and Interference Environments," *IEE 1982 International Radar Conference*, London, 1982.) This technique is often used for initializing tracking filters in high-density clutter environments. A straight line of images over a series of observations indicates that the observed object and vehicle are converging at a constant speed, which is consistent with an actual object in front of a moving vehicle. This straight line is referred to herein as the "trajectory" of the object.

Figure 2:
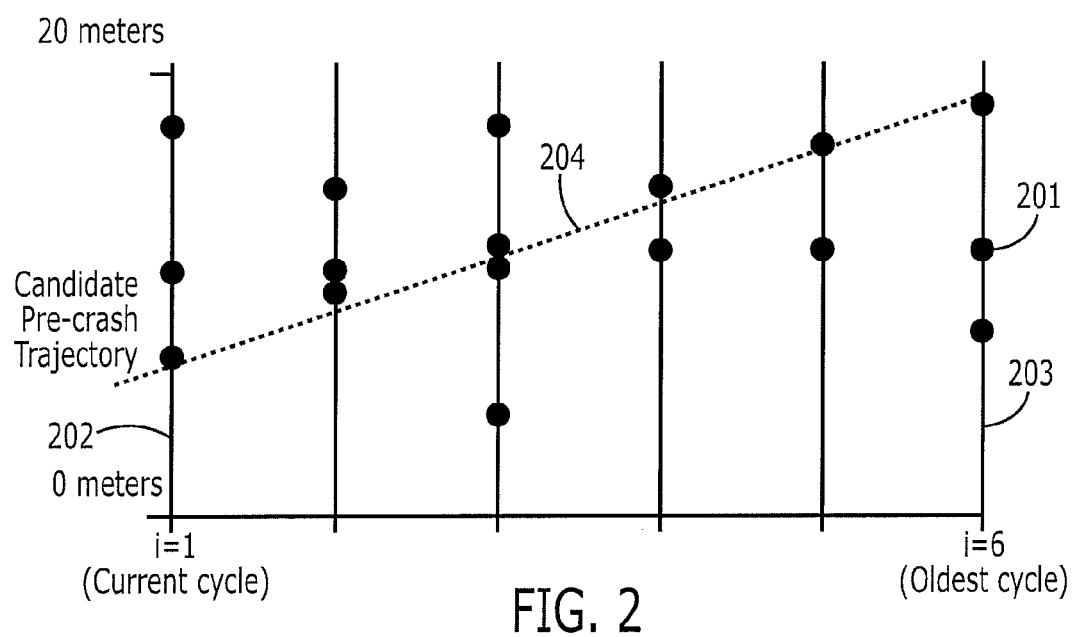
FIG. 2 illustrates the retrospective-detection algorithm for determining a trajectory from a number of sequential observations.

FIG. 2 illustrates the retrospective-detection algorithm for the case in which the number of sequential observations or scans M equals six. In the figure, each filled circle represents an object observation 201 whose range is indicated by its position on the vertical scale. The left-most and right-most vertical axes 202, 203 provide object observations from the current and the oldest sensor cycles, respectively. In the example of FIG. 2, a single trajectory 204 has been identified as satisfying the criteria. This criterion requires that a candidate trajectory must have an observation in each of the six cycles. This requirement, however, could be relaxed such that a candidate trajectory must be present in N out of M scans to enable detection of trajectories having lower object-detection probabilities. Furthermore, although this technique is useful for objects that converge toward the sensing system at a constant speed, other techniques may be used to verify observed objects that are accelerating or otherwise showing inconsistent velocity relative to the sensing system. For example, object locations could be represented in both x and y coordinates, rather than range. As another example, the model for object motion could include constant acceleration rather than constant velocity. These techniques, however, tend to more complex and time consuming and, thus, may be less preferred compared to simpler assessments. It should be understood, however, that as computational capacity increases, more complex techniques for verifying image authenticity might become more practical.

In addition to authenticating image data, it may be preferable to screen data to identify only "relevant" observed objects. Relevant observed objects are those objects that meet certain criteria established to weed out objects that pose no threat. In a preferred embodiment, the image must correspond to an object that has a closing velocity within certain limits—for example, 10 mph and 90 mph. Generally, objects with velocity outside of these ranges are not relevant. Specifically, an object that is closing on the vehicle at less than 10 mph requires no collision mitigation preparations. Likewise, an object which is closing at greater than 90 mph, in most circumstance, is not relevant since, at that speed, it is either an artifact or moving so fast that collision-mitigation measures will have little effect. In addition to minimum and maximum closing velocities, other useful target parameters for evaluating candidate objects include object bearing and Doppler, if available. These parameters require additional computational resources, however, and the determinants of the time required to calculate them may outweigh their usefulness.

Thus, in the object identification phase of the process of the present invention, image data is generated and preferably verified and evaluated for relevancy. The degree to which the image data are verified and/or evaluated for relevancy is typically an optimization of the higher reliability the additional analysis provides compared to the computational time it requires.

In an alternate embodiment of the process for the present invention, the output from a tracking filter is used instead of the output from object identification step 101. In this embodiment, each track trajectory generated by the tracking filter is used as input to step 102. In general, the implementation and characteristics of tracking filters are well known and details will not be discussed herein in detail.

Determination of Imminent-Collision

In step 102, the likelihood of a collision based on the image data generated in step 101 is considered. To this end, the process of the present invention determines that a collision is imminent when the ratio of the probability that the observed object is actually within a collision zone to the probability that the observed object is actually within a safe zone is greater than a certain value. Preferably, this is performed prior to performing a rigorous evaluation of the image data to estimate target parameters (e.g., position, direction, velocity, time-to-impact) to achieve accuracy better than that inherent in single images. That is, unlike prior art approaches which determine the likelihood of a collision by first calculating a trajectory from a series of image data and then extrapolating it to determine if the observed object is in the course of the vehicle, the present invention uses relative probabilities to determine the likelihood of a collision. Specifically, the present invention relies on known probability distributions to evaluate whether a given image or set of images can be declared with sufficient assurance to be within a collision zone or a safe zone. Therefore, step 102 requires that collision and safe zones be established and then the comparative probability that the observed objects lie within either zone be determined.

In establishing collision and safe zones, the present invention recognizes two different situations. The first, and simpler situation, occurs when the collision and safe zones are independent of the object. In other words, the position or movement of the object does not change the perceived collision and safe zones with respect to the vehicle. Such a situation exists when the object's lateral position is not changing significantly with respect to the vehicle's course. Such a situation exists in most head-on and rear-end collisions. This situation is referred to herein as an "object-independent collision" and the respective collision and safe zones are referred to as "object-independent zones."

The second situation is more complicated and occurs when the collision and safe zones depend upon the position and possibly even the relative speed of the object. Such a situation arises when the object is moving laterally with respect to the vehicle's course, which is typical in a side-impact collision. As used herein, the term "side-impact collision" refers to a collision between the object and the vehicle in which the object has a velocity component traverse to the course of the vehicle at time of imminent impact. The second situation is referred to herein as an "object-dependent collision" and the respective collision and safe zones are referred to as "object-dependent zones."

Figure 3:
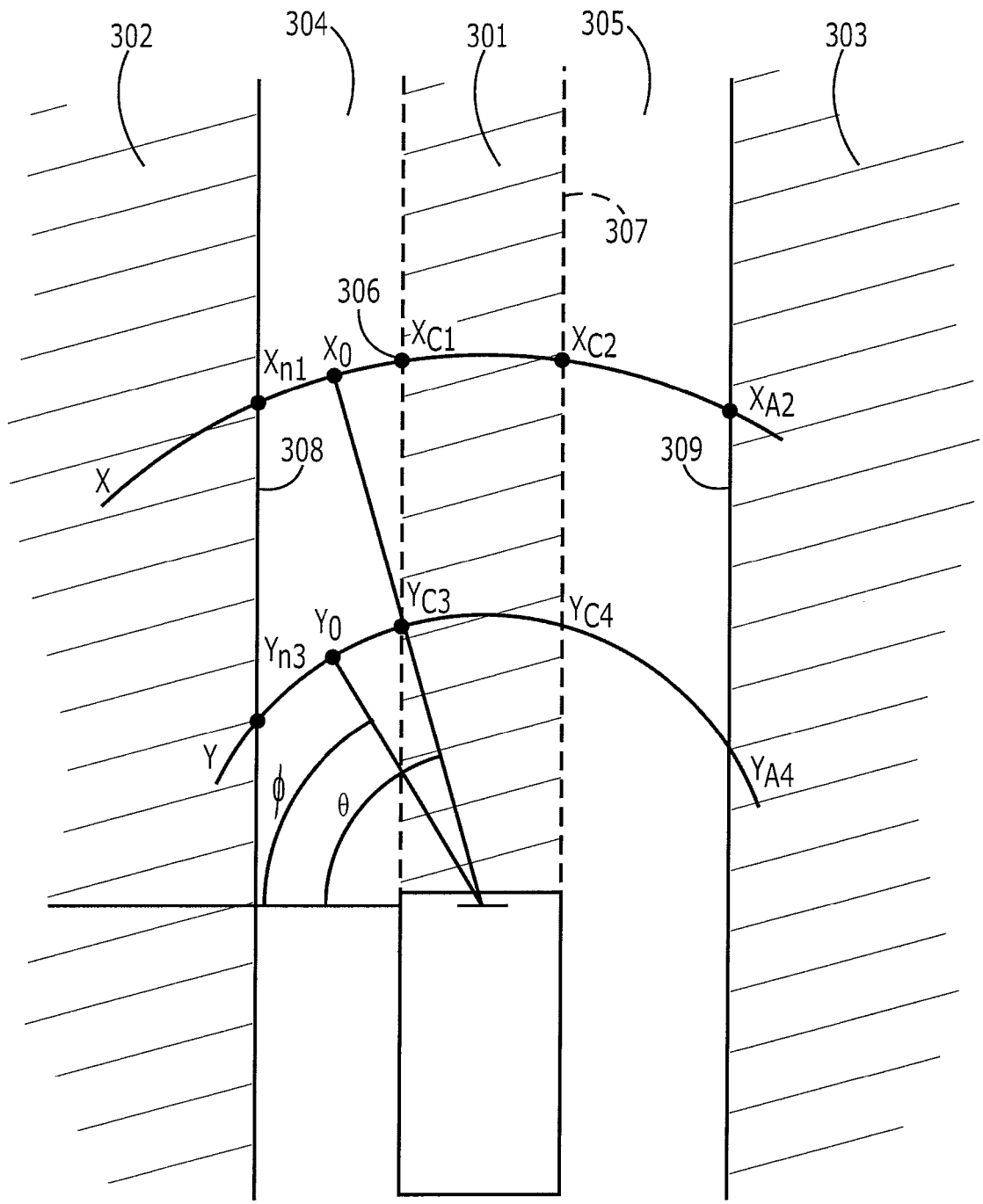
FIG. 3 shows position-independent collision and safe zones for a vehicle.

Referring to FIG. 3, the establishment of a collision zone 301 and safe zones 302, 303 is described with respect to an object-independent collision situation. In describing these zones, the terms "left," right," "front," "forward," "back," and "rearward" are used in relation to the vehicle, and are used for descriptive purposes only and should not be construed as limiting the scope of the invention.

As illustrated in FIG. 3, the area forward of the host vehicle can be divided into several zones. The collision zone 301 is the area expected to be occupied by the host vehicle, and is preferably about the width of the vehicle. The collision zone is demarcated by a first collision course 306 on the left and a second collision course 307 on the right. This zone is illustrated in FIG. 3 for a vehicle driving straight ahead, but will bend to either side to match lane curvature. (This is a known technique which might be based on a number of factors, including most fundamentally, steering wheel angle.) It is also possible to increase the width of the collision zone 301 as a function of distance from the vehicle in order to compensate for uncertainty in vehicle course. Safe zones 302, 303 are parallel to the left and right of the collision zone 301. Safe zones 302, 303 are areas in which objects are not likely to be struck by the host vehicle and are demarcated by first and second avoidance courses 308, 309, offset a certain distance to the left and right of the collision zone 301, respectively. Intermediate zones 304, 305 are the transition regions between the collision zone 301 and safe zones 302, 303. Specifically, intermediate zone 304 is the area between the first collision course 306 and the first avoidance course 308, while intermediate zone 305 is the area between the second collision course 307 and the second avoidance course 309.

The collision zone represents the area of crash certainty, while the safe zone represents the area of non-collision certainty. The probability of declaring an imminent collision should be very high for an object actually located the collision zone and very low for an object actually located in the safe zone. The intermediate zone provides a transition from the high-detection probability requirements for an object in the collision-zone to the low-detection probability requirements for objects in the safe-zone. In the preferred embodiment, there are no detection probability requirements for an object in the transition zone. The process of the present invention is able to accommodate any value of constant or variable width for an intermediate zone. A narrower width, however, will require more successive images to implement the same quality of imminent collision detection assessment. Assuming a fixed scan time, this reduces the time-to-impact for a collision decision. The intermediate zone, however, should not be so wide that it include areas where objects are very likely, or very unlikely, to pose a credible threat to the vehicle. In particular, the intermediate zone should not satisfy the detection probabilities required for either the crash zone or the safe zone. Therefore, the width of the intermediate zone is a tradeoff between maximizing time-to-impact and minimizing the region where collision performance is not well controlled. It should be understood that the collision, intermediate, and safe zones established in front of the vehicle for head-on collisions could also be established in back of the vehicle for rear-end collisions.

Figure 4:
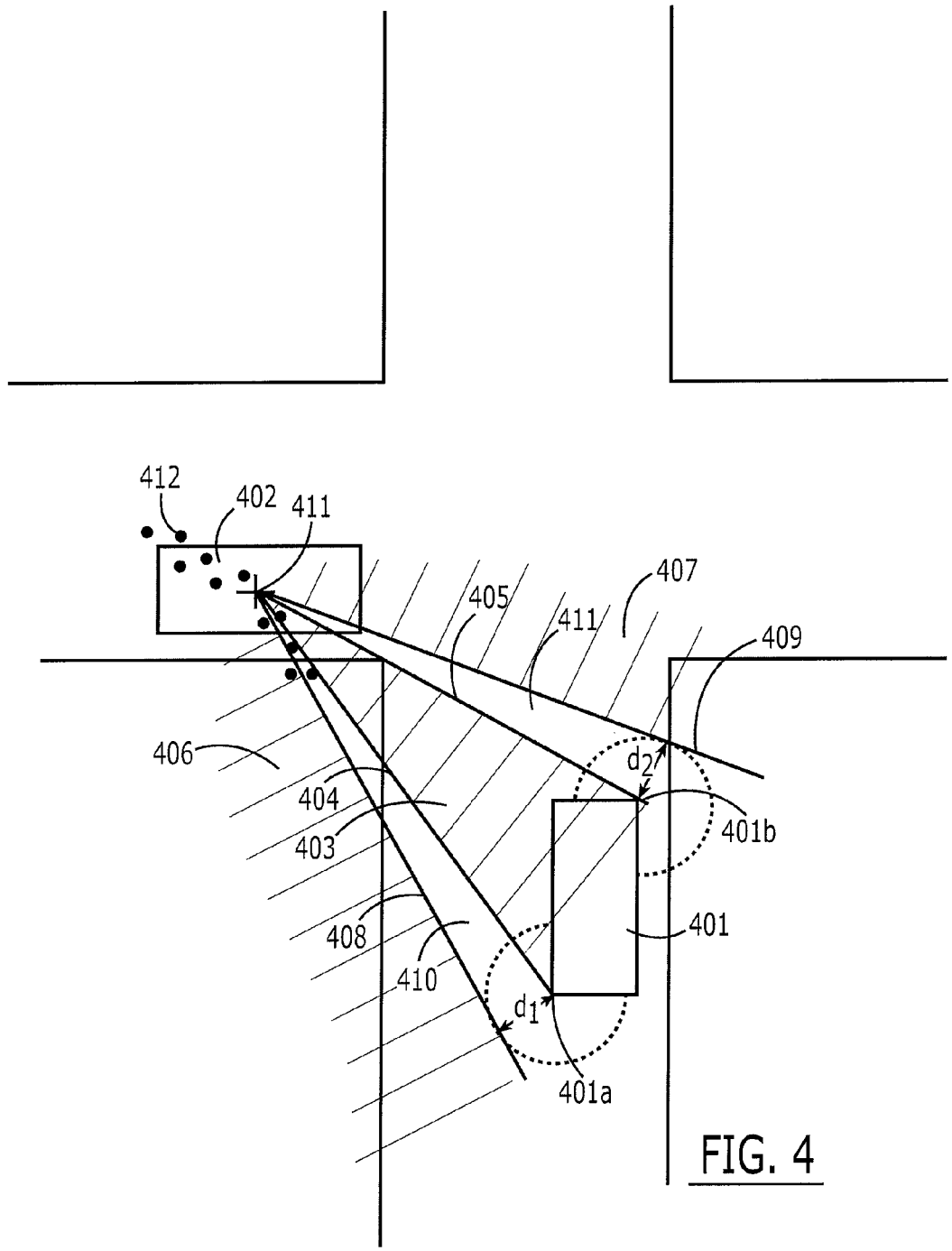
FIG. 4 shows position-dependent collision and safe zones for a vehicle relative to an object within the field of detection

Referring to FIG. 4, the concept of safe and collision zones is discussed with respect to object-dependent collisions. Establishing collision and safe zones for a side-impact collision is more complicated than for a head-on collision. The main difference is that, unlike a head-on collision in which the collision and safe zones are independent of the position of the object, in a side impact collision, the collision and safe zones depend upon the position of the object and will change as the position of the object changes. For example, the collision zone is significantly different for an object in front and to the left of the vehicle as opposed to an object in back and to the left. Therefore, before collision and safe zones can be established in this embodiment, the position of the object must be determined.

Establishing the position of the object may be performed on an image-by-image basis with each new image corresponding to a different object position and, thus, to a different establishment of collision and safe zones. However, since commercially-available sensing systems tend to have significant standard deviations, particularly with respect to bearing data, it is preferred to base the position of the observed object on a number of observations. For example, in one preferred embodiment, the position is determined as an average of image data. Referring to FIG. 4, the x-coordinate value for the estimated object location 411 equals a moving average of observed n number of x-coordinate values 412, and the y-coordinate value for the estimated object location 411 equals a moving average of observed n number of y-coordinate values. Accordingly, the average will change, or has the potential to change, but not drastically, with every new observed value. Alternatively, rather than basing the position on a simple moving average of observed images, the x center may be based on a variance-weighted average of observed x values and the y center may be based on a variance-weighted average of observed y values. The variance may be, for example, estimated $\sigma_x^2$ and $\sigma_y^2$ for each observation. It is also possible to estimate an object location with respect to the time of the first image, or, alternately, to the time of the most recent image, rather than the time between the first and the most recent image. Still other approaches for establishing the observed object's position will be obvious to those of skill in the art in light of this disclosure.

Once the object's position is determined, the collision and safe zones are established. Specifically, referring to FIG. 4, for an object 402 observed on the left side of the vehicle 401, the collision zone 403 is the area between a first collision course 404 from the estimated object location 411 to the most rearward portion 401a of the vehicle 401 and a second collision course 405 from the estimated object location 411 to the most forward portion 401b of the vehicle 401. It should be noted that the most rearward portion 401a and the most forward portion 401b of the vehicle 401 is determined as observed from the vantage point of the estimated object location 411.

The safe zones 406, 407 are on either side of the collision zone 403. In one embodiment, one safe zone 406 is the area rearward of a first avoidance course 408 between the estimated object location 411 to a location a certain distance $d_1$ from the most rearward portion 401a of the vehicle 401, and the other safe zone 407 is the area forward of a second avoidance course 409 between the estimated object location 411 and a distance $d_2$ from the most forward portion 401b of the vehicle 401. It should be appreciated that the collision and safe zones described above for a side-impact collision with respect to an object 402 on the left apply equally to an object on the right. As with the object-independent configuration, intermediate zones 410, 411 separate the collision zone 403 from the safe zones 406, 407.

The size of these intermediate zones, determined by the distance $d_2$ from the most forward portion 401b to the closest point on the avoidance course 409, and the distance $d_1$ from the most rearward portion 401a to the closest point on the avoidance course 408, is optimized for safety and convenience and may be based on a number of parameters including a predetermined safe radii about the vehicle, velocity of the vehicle, relative velocity of the vehicle and object, plus any other parameters which have a bearing on the likelihood or severity of a collision. In a simplistic embodiment, the intermediate zone is based on a predetermined radius about the corners of the vehicle. Referring to FIG. 4, radius $d_1$ and radius $d_2$ define the separation between the collision and avoidance courses. These radii may be predetermined regardless of the state of the vehicle and object. For example, the radii may be 10 feet regardless of the velocity of the vehicle or object. Although this embodiment is preferred from the standpoint of low computational overhead, it ignores the velocity of the vehicle and object which tends to be important for collision assessment. Specifically, a relatively thin intermediate zone may be preferred when the converging velocity of the vehicle and object is low, but a relatively wide intermediate zone is preferred when the converging velocity is high. For example, whether one feels comfortable with the object passing in front of the vehicle by one foot or 30 feet depends almost entirely on the converging velocity of the object and vehicle. Accordingly, in a preferred embodiment, the intermediate zone, or the distance the avoidance course is offset from the collision course is based on one or more of the following: estimated speed of the vehicle, estimated convergent velocities of the object and vehicle, and perceived potential threat of the object to the host vehicle. An intermediate zone that is established based on velocity data of the vehicle or object is referred to herein as a "velocity-dependent" intermediate zone or avoidance course.

Figure 5:
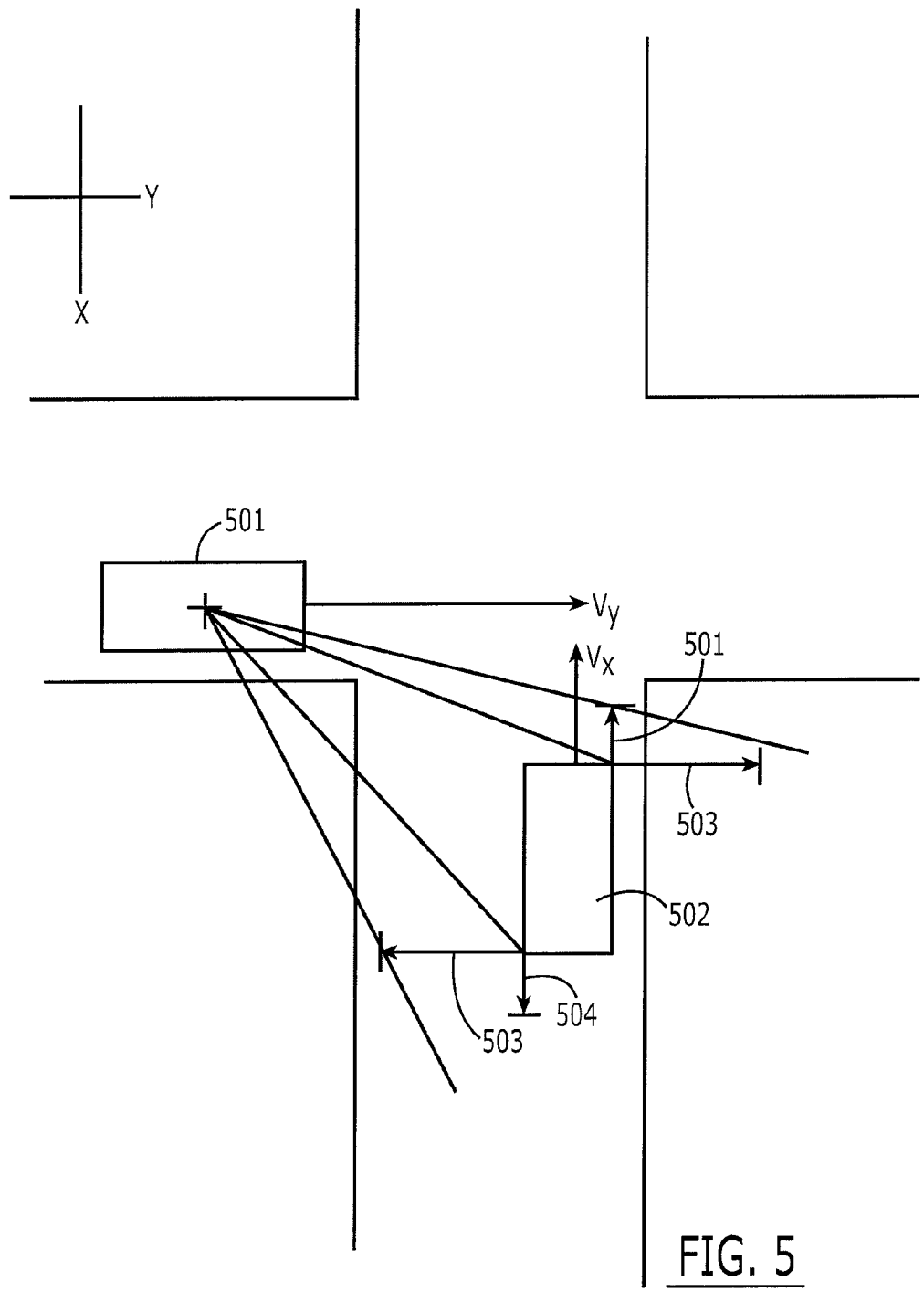
FIG. 5 shows position-dependent collision and safe zones adjusted for the relative speeds between the vehicle and object.

In some scenarios, the velocity-dependent avoidance course might be established based on a minimum "safe" time for avoiding a collision. For example, since the ability of a person to react is typically no less than about 500 ms, a safe time is going to be at least 500 ms. In a preferred embodiment, the avoidance courses are offset from the collision course by a distance corresponding to this time for a determined relative velocity. For example, referring to FIG. 5, if the relative velocity of the object 501 to the vehicle 502 along the y direction (i.e., the relative $v_y$ velocity vector) is 60 mph or 88 ft/s, then a suitable offset 503 of the avoidance course from the collision course at the vehicle may be 44 feet (i.e., 88 ft/s×0.5 s) along the y direction. If the relative velocity of the object 501 to the vehicle 502 along the x direction is 30 mph or 44 ft/s, then a suitable offset 504 of the avoidance course from the collision course may be 22 feet along the x direction. Since each suitable offset 503 and 504 will usually describe a different avoidance course, one would choose the suitable offset 503 or 504 that results in the widest intermediate zone (as illustrated in FIG. 5).

To minimize the computational overhead or uncertainty associated with the object-dependent collision approach, certain assumptions can be made. For example, the applicant has recognized that side-impact collisions may occur in intersections in which the object is traveling orthogonally to the vehicle. In such a situation, the object's $v_x$ velocity components is essentially the velocity of the vehicle. Therefore, in these situations, the $v_x$ velocity component can be assumed to be the velocity of the vehicle, which is readily determined. For example, if the vehicle is traveling at 25 mph, or 37 ft/s, the $v_x$ component of the object can be assumed to be 37 ft/s. Thus, if a 0.5 s safety cushion is desired, as in the example above, the offset distance 504 will be about 18 ft along the x direction. Combining this example with the one immediately above in which the object is traveling the in the y direction at 60 mph, it should be clear that the offsets in the x and y directions are 18 and 44 ft, respectively. In addition to approximating the $v_x$ velocity of the object as the speed of the vehicle, other approximations may be obvious to those of skill in the art in light of this disclosure.

The choice of whether to establish the collision and safe zones based on an object-independent collision or an object-dependent collision situation depends upon the application and computational resources available. That is, as mentioned above, although the object-independent collision situation is appealing from a computational efficiency standpoint, it may not as readily detect some types of collisions, such as side-impact collisions. Likewise, although the object-dependent collision approach is encompassing, it is costly from a computational standpoint and may be superfluous for head-on collisions in which the collision and safe zone change very little, if at all. Therefore, in a preferred embodiment, the imminent-collision detection system would involve both approaches. In a preferred embodiment an object-independent collision approach is applied forward of the vehicle to detect head-on collisions and rearward of the vehicle to detect rear-end collisions, while an object-dependent collision approach is applied along the sides of the vehicle to detect side-impact collisions.

Once the collision zones and safe zones are established, a determination is made whether the observed object can be declared to be within collision zone 301 or 403 of FIG. 3 or 4, respectively, so as to satisfy the probability of detection requirement when the object is actually within the collision zone 301 or 403, and to satisfy the false-alarm requirement when the object is actually with a safe zone 302, 303, or 406, 407, respectively. We will refer to the border between a collision zone and an intermediate zone as a collision course, and to the border between an intermediate zone and a safe zone as an avoidance course. To this end, it is preferable to determine the probabilities that an observed image represents an object actually located on the collision course and, as a second hypothesis, actually located on the avoidance course. Border conditions are the most challenging situation for imminent-collision detection. If the actual course is elsewhere in a collision or safe zone, then our detection and false-alarm requirements will also be satisfied.

In a preferred embodiment, determining the probability of the object along the collision and avoidance courses requires measuring the range of the object and then comparing the probability density distributions in bearing for an object on the collision and avoidance courses at that range. In this embodiment, object range is assumed to be measured with much higher accuracy than object bearing. Of particular interest herein is the bearing deviation of the sensing system. For example, in an SRR system, the standard deviation for bearing is presently about 4°. This is significant, particularly at longer ranges when a 4° error in bearing can easy mean the difference between an object being on a collision course and not. For example, at a range of 100 ft, a 4° error in bearing equates to a 7 ft difference—which is often sufficient to render an observed object either in or out of the collision zone. Standard deviation for range tends to be significantly less for SRR than for bearing, typically below 4 cm. Consequently, range is used preferably to correlate an observed object's bearing with a probability density distribution of bearings for an actual object on the collision and avoidance courses. It should be noted, however, that if range were less accurate than bearing, then object bearing could be used to correlate an observed object to a probability density distribution of ranges for an object being on collision and avoidance courses at the same bearing.

Referring to FIGS. 3 and 6 (a), a given observed object $X_θ$ has an observed range X and an observed bearing θ, measured with respect to the observing sensing system. The observed range X can be used as an estimate of the true range, and we consider now the probability that the observed bearing θ is actually an observation of an object located on one of several courses. The courses of interest are the first avoidance course 308, the first collision course 306, the second collision course 307, and the second avoidance course 309. The location of interest on each course is that which has a range equal to X from the observing sensing system. Let us denote these locations as $X_{a1}$, $X_{c1}$, $X_{c2}$, and $X_{a2}$, respectively. Please note that the bearings for these locations are equal to a1, c1, c2, and a2, respectively.

Figure 6A:
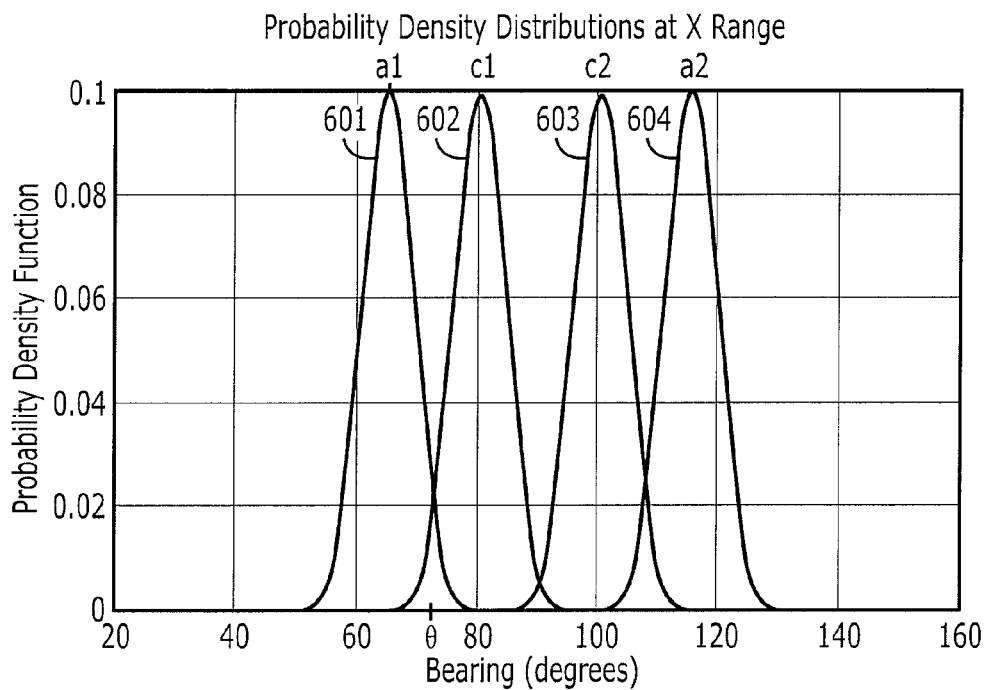
FIGS. 6(a) and 6(b) show the probability density distribution at the collision and avoidance courses shown in FIG. 3 at ranges X and Y, respectively.

FIG. 6(a) illustrates four probability density functions 601, 602, 603, 604, for observed bearing, one centered at each of the bearing values of interest, a1, c1, c2, and a2, respectively. A probability density function provides a means to determine the probability that a value will occur within a particular interval. In particular, this probability is obtained by integrating the probability density function over the interval of interest. For our use, we recognize that the probability density function provides a value that is proportional to the probability of occurrence in some very small interval.

The shape of a probability density function can be determined using theoretical or experimental means. Two probability density functions (e.g., 601 and 602) can be used to determine which of two actual bearings (e.g., a1 and c1) are more likely to correspond to an observed bearing value (e.g., θ). In particular, we can determine the relative probability by forming the ratio of the value of the probability density function 601 at the observed bearing θ, and the value of the probability density function 602 at the observed bearing θ. In the example of FIG. 6(a), given the indicated observed bearing θ, the actual bearing is equally likely to be a1 and c1 because the probability density functions 601 and 602 have equal values at θ.

The difference in bearing between different course locations at a given range tends to increase as the object becomes closer to the sensing system. For example, referring to FIG. 6(b), the probability density distributions 611, 612, 613, 614 corresponding to a range Y are much more separated in bearing than the example of 6(a) with its larger-valued range X. This usually results in a greater contribution to determine whether the observed object is on a collision or avoidance course. This statement is valid even when the value of the probability density function is near zero. For example, the value of probability density function 613 at observed bearing φ is many times larger than the value of probability density function 614 at observed bearing φ. Therefore, the observation φ is much more likely to arise from an actual bearing of c4 than an actual bearing of a4. Thus, the process of the present invention is able to calculate with greater certainty whether an object is on or off a collision course as time-to-impact becomes shorter.

Preferably, the probabilities of the observed object being on a collision or avoidance course are used in a comparative sense to determine whether an imminent-collision condition exists with a sufficiently high degree of certainty. To this end, in a preferred embodiment, an adaptation of the sequential probability ratio test (SPRT) algorithm is used to determine whether a candidate object has an imminent-collision trajectory. The general concepts and principles of SPRT are known (see, e.g., A. Wald, *Sequential Analysis*, New York: Wiley, 1947), although this analysis technique has never been adapted, to the applicant's knowledge, for collision detection purposes.

In adapting this approach to imminent-collision detection, let $f(\phi,\mu)$ be the probability density function of the observed image where $\phi$ is the observed bearing and $\mu$ is the postulated bearing of the image. Given observed images having bearings $\phi_1, \ldots \phi_M$, from a candidate trajectory, a probability measure that it is an observation of the bearing trajectory, $\mu_1, \ldots \mu_M$, is given by:

$$p = f(\phi_1,\mu_1)f(\phi_2,\mu_2)f(\phi_M,\mu_M) \quad (1)$$

Considering the problem of determining which of two different bearing trajectories is the true trajectory for a set of observed bearings, one trajectory, $\mu_{01} \ldots \mu_{0M}$, is denoted as the null hypothesis, and the other trajectory, $\mu_{11}, \ldots \mu_{1M}$, is denoted as the alternative hypothesis. In this case, the probability measures for being an observation of the null hypothesis and the alternative hypothesis are given by (2) and (3), respectively.

$$p_0 = f(\phi_1,\mu_{01})f(\phi_2,\mu_{02}) \ldots f(\phi_M,\mu_{0M}) \quad (2)$$

$$p_1 = f(\phi_1,\mu_{11})f(\phi_2,\mu_{12}) \ldots f(\phi_M,\mu_{1M}) \quad (3)$$

In adapting SPRT analysis to imminent-collision detection, the null hypothesis is the collision course while the alternative hypothesis is the avoidance course closest to the collision course. For example, referring to FIGS. 3 and 4, if the null hypothesis is the first collision course 306, 404 then the alternative hypothesis is the first avoidance course 308, 408. Note that there are two instances for each null-alternative hypothesis pair—left and right with respect to FIG. 3 (collision-independent collision situation) and forward and rearward with respect to FIG. 4 (collision-dependent collision situation). Thus, there is a first hypothesis pair based on the first collision and avoidance courses, and a second hypothesis pair based on the second collision and avoidance courses.

An observed object is determined to be on a collision course when:

$$p_0/p_1 > B \quad (4)$$

The threshold, B, which is also referred to herein as the first value, is determined using the detection probabilities such as those specified in Table I. In particular, Wald suggests the following approximation:

$$B \approx (1-\alpha)/\beta \quad (5)$$

In (5), $\alpha$ is the probability of missed detection of the null hypothesis, and $\beta$ is probability of false alarm (i.e., choosing the null hypothesis when the alternative hypothesis is the correct choice). It is well known (see, e.g., M. Woodroofe, *Nonlinear Renewal Theory in Sequential Analysis*, Philadelphia: SIAM, 1982) that the optimal value of threshold B is a complicated function of the probability density function. Nevertheless, equation (5) serves as a convenient approximation whose performance for specific $\alpha$, $\beta$ values can be validated through simulation. As way of an example, suitable results have been demonstrated for a detection probability (i.e., $1-\alpha$) of the null hypothesis to be equal to 80%, and a probability of false alarm (i.e., $\beta$) to be equal to 0.001%. Given a candidate trajectory, the SPRT determination is applied separately to the first hypothesis pair, and then to the second hypothesis pair. If the first hypothesis pair SPRT test accepts the null hypothesis, then the true trajectory is understood to lie to the right of the first collision course. Likewise, if the second hypothesis pair SPRT test accepts the null hypothesis, then the true trajectory is understood to lie to the left of the second collision course. When both tests accept their null hypotheses, then the candidate trajectory is understood to be an observation of a trajectory contained within collision zone. This situation validates a candidate trajectory as being an imminent-collision trajectory.

Figure 6B:
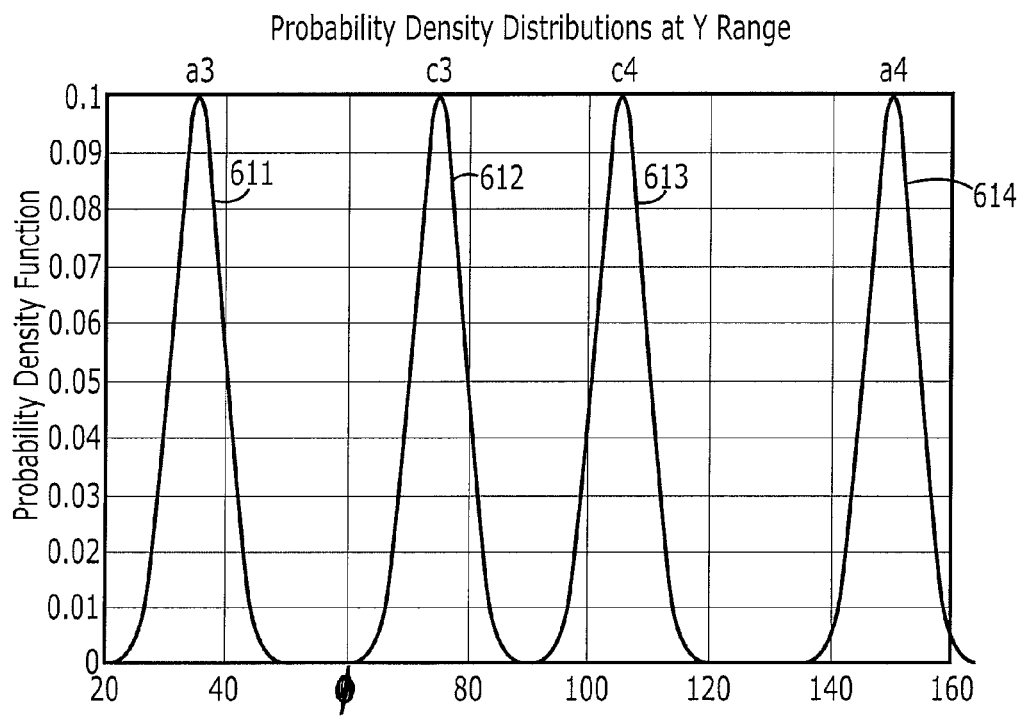

An example of how this test operates will be provided using the scenario of FIG. 3 and the probability density distributions of FIGS. 6(a) and 6(b). If we specify a probability of missed detection of the null hypothesis, α, equal to 0.2, and a probability of false alarm, β, equal to 0.00001, then use of equation (5) determines our decision threshold, B, to be equal to 80000.

Referring to FIG. 3, in our first image scan, we observe $X_\theta$, corresponding to an observed range X, and an observed bearing θ. Using observed range X, we determine the bearing values corresponding to the first avoidance course and the first collision course at this range to be a1 and c1, respectively. Using our knowledge of the probability density function for bearing, as illustrated by 601 and 602, we determine the value for each function at the observed bearing θ. Note that the bearing values a1 and c1 are used to properly locate the probability density functions 601 and 602. In this example, the probability density functions 601 and 602 have the same value at observed bearing θ. Thus, the ratio of these two values is equal to 1.0, which is less than our calculated decision threshold B. Therefore, according to equation (4), we can not determine the object to be on the first collision course.

Referring to FIG. 3, in our second image scan occurring at some time latter, we observe $Y_\varphi$, corresponding to an observed range Y, and an observed bearing φ. Repeating the same process as with the previous scan, we obtain bearing values a3 and c3 and probability density functions 611 and 612, corresponding to the first avoidance course and first collision course, respectively. We determine the value of probability density function 612 at the value of φ to be, for example, equal to 1.2E-5, and the value of the probability density function 611 at the value of φ to be equal to 6.6E-9. The ratio of the two values is equal to 1818. As required by equations (2) and (3), we must multiple this ratio by the ratio obtain from the previous scan (i.e., 1.0) to obtain a cumulative ratio equal to 1818. Using equation (4), we determine that 1818 is less than decision threshold B (i.e., 80000), and so we are still unable to declare that the observed object is on the first collision course.

Report Generation

In a preferred embodiment, a collision report is generated once a collision is determined to be imminent in step 102 above. If a plurality of collisions is determined in step 102, a report is preferably generated on the trajectory with the shortest time-to-impact, although other prioritization methods are possible, including severity of impact.

The imminent-collision report comprises target parameters, which typically include estimated time-to-impact and relative velocity. Additional crash parameters, such as direction, impact region and impact angle, however, could be determined. It is interesting to note that, in a preferred embodiment, target parameters are estimated with accuracy better than a single image only after they are determined to be on a collision course with the vehicle. This occurs because the imminent-collision decision has been formulated as a detection process, having possible outcomes of only true (i.e., imminent collision is present) or false (i.e., imminent collision can not be determined to be present).

Target parameters may be determined using a number of known estimation techniques. In a preferred embodiment, they are estimated by fitting a linear trajectory to the observations using a least-squares criterion. The linear fit also serves as an additional means to qualify the trajectory. In particular, if the value of a squared-error metric calculated using equation (6) exceeds a certain threshold, then the imminent-collision trajectory is discarded. This last qualification serves to eliminate trajectories formed from observations of more than one object.

$$\text{Metric} = \sum_{i=1}^{M} \frac{(\phi_i - \psi_i)^2}{\sigma_\phi^2} \quad (6)$$

In equation (6), $\phi_i$ is the $i^{th}$ observed bearing, $\Psi_i$ is the $i^{th}$ bearing of the best-fit trajectory, and $\sigma_\phi^2$ is the variance of observed bearing. Assuming independent, unbiased, and normally distributed bearing errors, the metric has a chi-square distribution with M degrees of freedom. For example, the trajectory may be rejected when the metric value exceeds the 95% value (i.e., the value that would be expected to be exceeded only 5 percent of the time when the trajectory was actually valid). For M equals 6, this corresponds to a metric value of 13.

Although the least squares criterion is preferred to calculate target parameters and to verify that the observed object is on a collision course with the vehicle, it is not the only approach for determining this information. Those of skill in the art will appreciate that there are other techniques that can be performed on the observation data to determine these parameters and/or to validate the imminent-collision trajectory, including, for example, use of the techniques described in this invention to detect the impact region and/or impact angle associated with the imminent collision. This could involve the postulation of collision courses having different impact regions and/or angles, and the use of the SPRT algorithm to determine if one course could be chosen while satisfying stated detection and false-alarm probabilities.

Deploy Collision Mitigation Measures

Once the imminent-collision report is generated, it is sent to a controller, which is adapted to deploy collision mitigation measures at the appropriate time based upon the target parameters provided in the imminent-collision report. Preferably, each collision mitigation measure would be deployed before the remaining time to impact (plus some addition margin to account for uncertainty in this estimated time value) is less than the time required to effectively deploy the particular measure. The following are examples of collision mitigation measures and suitable time-to-impact trigger limits:

| Collision mitigation measure | Time-to-impact trigger |
| --- | --- |
| Sound horn | 2 seconds |
| Tighten seat belt | 200 mSec |
| Adjust head rests | 200 mSec |
| Deploy knee protection | 100 mSec |
| Configure airbag deployment | 10 mSec |

It should be understood that these collision mitigation measures and their time-to-impact trigger limitations are given for illustrative purposes only and are not intended to limit the scope of this invention. Indeed, one skilled in the art will appreciate that the deployment time depends greatly on the technology used to implement the measure, as well as the desired effect of the measure. Additionally, it is expected that, over time, additional collision mitigation measures will be invented and employed in accordance with the present invention.

In addition to these collision mitigation measures, step 104 may also involve transmitting the imminent-collision condition to a central receiving facility or emergency personnel along with positional information (e.g., from a GPS) to alert others of the situation such that aid may be dispatched.

System Architecture

Figure 7:
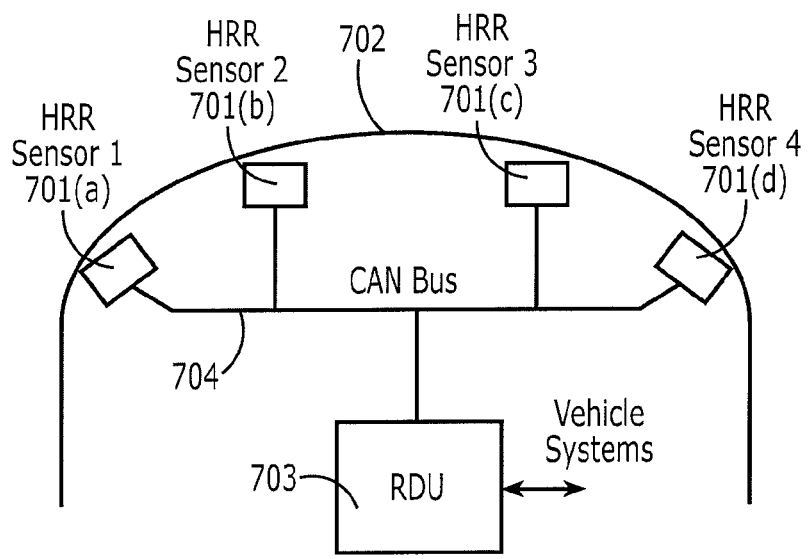
FIG. 7 shows a typical SRR vehicle installation.

It is anticipated that the process of the present invention may be practiced in any of a number of system configurations. Essentially, the process requires a system that has one or more sensing systems. Preferably, the process is practiced in a system which is existing or has other functionality, for example, a system used for automated cruise control (ACC) or stop/go traffic. Referring to FIG. 7, a typical SRR vehicle installation is shown. Four SRR sensors 701(a)-701(d) are installed behind the fascia of the front bumper 702. It should be understood that a similar system of SRR sensors may be installed on the side and rear portions of the vehicle.

Currently employed SRR sensors are capable of detecting objects in range and bearing out to a maximum distance of 30 meters. It is anticipated that future generations of SRR sensors will have greater range. The sensors communicate to a central computer called the Radar Decision Unit (RDU) 703 through an automotive Controller Area Network (CAN) bus 704. The RDU 703 is responsible for sensor fusion, and the implementation of vehicle applications. Applications for a front-bumper system might include parking aid, stop & go cruise control (i.e., vehicle automatically maintains appropriate distance to a followed vehicle in stop & go traffic conditions), in addition to a collision detection application.

Figure 8:
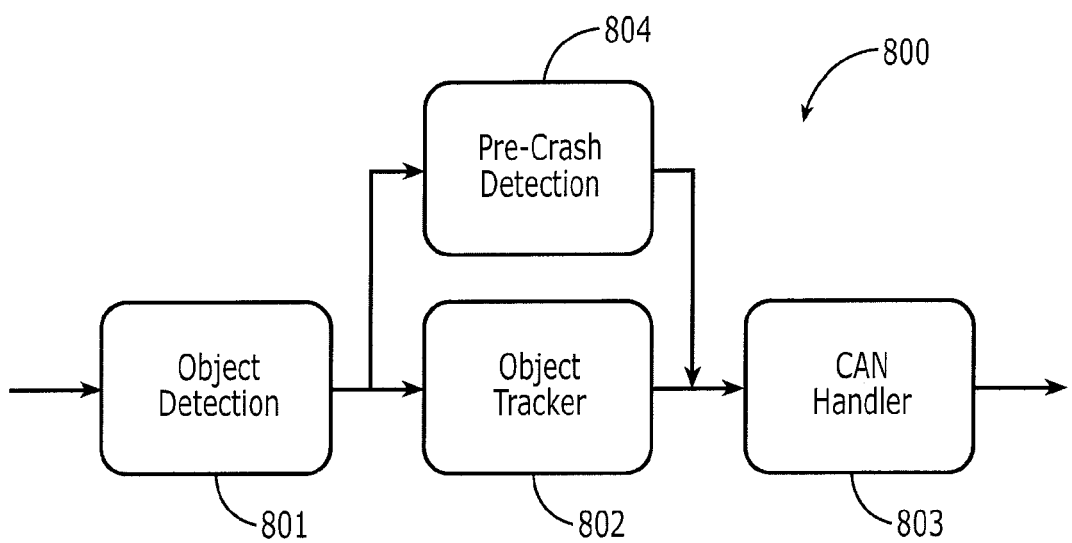
FIG. 8 shows a sensor software data flow diagram.

A preferred embodiment of the imminent-collision algorithm is executed in the sensor software. A data flow diagram 800 of this algorithm is shown in FIG. 8. The software can be divided into four modules. The first module 801 is object detection, which is responsible for detecting objects from signal waveforms generated by the radio-frequency (RF) front end. In the second module 802, an object tracker processes the detected objects using tracking filters as described above. The third module 803 is the CAN handler which delivers the resulting information to the RDU through the CAN bus. Preferably, the imminent-collision algorithm operates as a discrete module 804 in the sensor software, in parallel to the object tracker 802 by accepting its input from object detection 801, and providing its output to the CAN handler 803.

Figure 9:
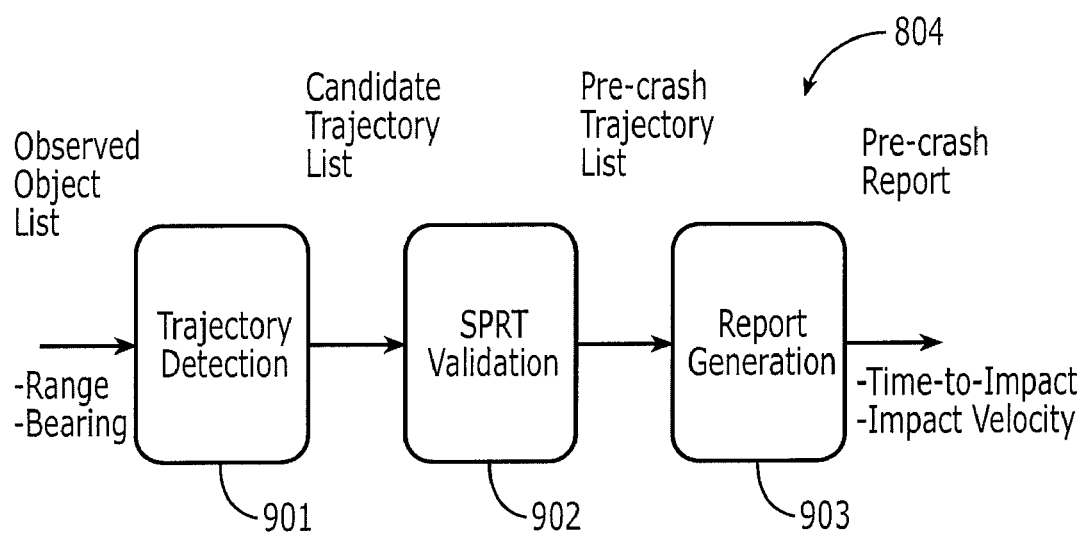
FIG. 9 shows a detailed data flow diagram for the imminent-collision detection module shown in FIG. 8.

FIG. 9 provides a detailed data-flow diagram for the imminent-collision detection module 804 of FIG. 8. Initially, the observed object list, which is the output of object detection (module 801 in FIG. 8), is inputted to the trajectory detection step 901 of imminent-collision module 804. The object list provides range and bearing information for each object detected during the current cycle. The object list may also include Doppler velocity, which improves performance but is not critical to imminent-collision algorithm functionality. The trajectory detection step calculates object trajectories as described above with respect to step 101. As mentioned above, this stage may also employ techniques such as the retrospective/detection algorithm to filter false from real observed objects.

In alternate embodiment, the imminent-collision algorithm 804 is adapted to operate by accepting its input from the object tracker 802 instead of object detection 801. In this embodiment, output of the object tracker 802 would be used instead of the output of trajectory detection 901.

Once the trajectories are calculated, the data flows to the SPRT validation step 902. In this step, the probability of the observed object being along a collision and avoidance course is considered by considering the probability density distribution along those courses as discussed above with respect to step 102 of the process. The last step in the module 804 is the report generation step 903 in which a report is generated as described above with respect to step 103. In one embodiment, each sensor transmits an imminent-collision report to the RDU 703 (see FIG. 7) during each cycle. The report conveys information on detected imminent-collision object(s), if any were detected during the current cycle. The RDU imminent-collision application makes an appropriate decision for safety-system activation based on reports from one or more sensors.

It should be understood that the system and software structure illustrated in FIGS. 7 through 9 is for illustrative purposes only and represents just one of numerous embodiments that the system of the present invention may take. For example, for reasons of safety-system design, the imminent-collision application might reside in a separate electronic control unit (ECU) monitoring sensor CAN-bus communications. Furthermore, rather than executing the imminent-collision module 804 at the sensor level, it may be preferable that these computations be made in the ECU. In such an embodiment, the detection sensors may supply the ECU with raw image data and the ECU may execute the imminent-collision module 804. It is also contemplated that, rather than providing a crash report to the RDU 703 through the CAN bus 704, it may be preferable to execute collision mitigation measures directly from detector sensors 701(a)-701(d). It is even contemplated that the processing of image data from the sensing system may be done outside the vehicle by transmitting the image data to a central processing facility, which receives, monitors and generates imminent-collision reports for a plurality of vehicles. Therefore, the degree to which the computational analysis is distributed among the various sensors or aggregated within one or more processing units, is a question of optimization which one skilled in the art can perform in light of this disclosure.

EXAMPLES

Example 1

This example demonstrates the reliability of the process of the present invention to detect an imminent-collision and avoid false alarms within certain probabilities. In this example, the imminent-collision detection algorithm was implemented in its object-independent formulation. To this end, a number of simulations were run with objects in positions 1-7 relative to a vehicle. Position numbers are as defined in the first column of Table III. Position 1 is dead center in the vehicle's course, position 3 is along one collision course, and position 7 is along the avoidance course. The imminent-collision detection algorithm was implemented in the C programming language. The imminent-collision requirements are set forth in Table I, while Table II provides assumptions used in the simulation.

TABLE I

Imminent-Collision Requirements (notional)

| Parameter | Value |
| --- | --- |
| Minimum Closing Velocity | 10 mph (4.5 m/s) |
| Maximum Closing Velocity | 90 mph (40.25 m/s) |
| Detection Probability (collision zone) | 0.8 minimum |
| False Alarms (avoidance zone) | $10^{-5}$ maximum |
| Width of Intermediate Zone | 1.5 meters |
| Maximum Time-to-Impact at Detection | 500 ms |
| Desired Time-to-Impact at Detection: | |
| pre-trigger airbag | 10 ms |
| reversible restraints | 50-200 ms |

TABLE II

Simulation Parameters

| Parameter | Value |
|---|---|
| Sensor Location | center of bumper |
| Sensor Cycle Time | 20 ms |
| Object Velocity | −90 mph (−40.25 m/s) |
| Object-Detection Probability | 100 percent |
| Maximum Object-Detection Range | 20 meters |
| Standard Deviation of Object Range | 4 cm |
| Standard Deviation of Object Bearing | 4 degrees |

The algorithm was exercised through simulated scenarios in Matlab. Each trajectory was simulated using one million trials. Table III provides detection-probability results for several different trajectories parallel to the collision-course trajectory.

TABLE III

Detection Probability (Simulated Results)

| Position | Offset from Collision-Course Trajectory | Probability |
|---|---|---|
| 1 | −0.75 meters (i.e., center of collision zone) | 0.993322 |
| 2 | −0.375 meters | 0.989825 |
| 3 | 0 meters (i.e., collision course) | 0.964225 |
| 4 | +0.375 meters | 0.799434 |
| 5 | +0.75 meters | 0.094678 |
| 6 | +1.125 meters | 0.000526 |
| 7 | +1.5 meters (i.e., avoidance course) | 0.000000 |

Within the collision zone, (i.e., positions 1-3), the probability of detection was 96 percent or greater—far exceeding the 80% minimum probability for detecting a collision. Collision probability for the intermediate zone (i.e., positions 4-6) ranged from a high near the collision course of 79.9434% to a low near the avoidance course of 0.0526%. Collision probability in the safe zone (i.e., position 7) indicates that no imminent-collision was detected in compliance with the $10^{-5}$ false-alarm requirement. Therefore, in all instances, the system and process of the present invention detected the presence of an object in the collision zone with the desired degree of certainty.

Another important performance parameter is the time remaining to impact when an imminent-collision decision is made. In particular, this determines the available collision-mitigation measures that may be deployed. As shown in Table IV, the first column provides warning times, and the second and third columns provide simulated probability of satisfying these warning times for objects on the centerline (i.e., position 1) and on a collision course (i.e., position 3), respectively. Ten milliseconds or greater warning is provided for 99 percent of centerline, and 96 percent of collision-course trajectories. This is representative of the time required to pre-trigger an airbag. Recall from Table I that reversible restraints require 50-200 ms. For centerline trajectories, this warning time is achieved 98 to 85 percent of the time, respectively. For collision course trajectories, it is satisfied 95 to 52 percent, respectively.

TABLE IV

Time-to-Impact Distribution (Simulated Results)

| Minimum Time-to-Impact at Detection | Satisfying Percentage | |
|---|---|---|
| | Centerline Trajectory | Collision Course Trajectory |
| 10 ms | 0.99 | 0.96 |
| 50 ms | 0.98 | 0.95 |
| 100 ms | 0.97 | 0.87 |
| 200 ms | 0.85 | 0.52 |

These results are for an object velocity of −90 mph, which is worst case. Results are significantly better for slower velocities. For example, at −70 mph, 80% of collision course trajectories are detected with 200-mSec warning time.

Example 2

This example shows that the process of the present invention functions in real-world applications to provide reliable reports of imminent collisions. The algorithm used was the same as that used in Example 1 along with the same test parameters and assumptions in Tables I and II.

The algorithm was exercised on data recorded from an SRR sensor installed on a Mercedes E320 automobile. The imminent-collision object was a stationary, vertical, 3-inch diameter PVC pole.

Several experiments were performed. The first and second experiments were to demonstrate a near miss. In one experiment, the test vehicle was driven 25 mph past the pole at 0.75 meters to the left of the vehicle. The experiment was repeated with the pole at 0.75 meters to the right of the vehicle. From Table III, simulation results suggest that at this offset from the vehicle, we might expect an imminent-collision detection to occur 9.4 percent of the time. Neither real-world trial generated an imminent-collision report. Although not conclusive, these results are consistent with expectations. A third experiment was performed during which the vehicle was driven directly towards the pole at 15 mph. The brakes were applied just in time to avoid striking the pole. In order to simulate an apparent imminent-collision situation, the sensor was operated with 30-millisecond cycle time, but the imminent-collision algorithm was informed that it was 20 milliseconds. This increased apparent velocities by fifty percent. Table V provides the resulting imminent-collision reports.

TABLE V

Imminent-collision Reports (Real-world Data)

| Cycle | Time-to-impact | Velocity | Distance |
|---|---|---|---|
| 922 | 447 ms | 22 mph | 4.42 meters |
| 923 | 444 ms | 21 mph | 4.26 meters |
| 924 | 442 ms | 21 mph | 4.09 meters |
| 925-931 | No Reports | — | — |
| 932 | 388 ms | 17 mph | 2.91 meters |
| 933 | 372 ms | 17 mph | 2.76 meters |
| 934 | 375 ms | 16 mph | 2.64 meters |
| 935-940 | No Reports | — | — |
| 941 | 336 ms | 13 mph | 1.93 meters |
| 942 | 369 ms | 11 mph | 1.86 meters |
| 943 | 380 ms | 10 mph | 1.77 meters |

The first imminent-collision report was generated in cycle 922 when the pole was at 4.42-meters distance with an estimated time-to-impact of 447 milliseconds. Note that there are no imminent-collision reports in cycles 925-931, and 935- 940. This occurred because trajectory detection requires six consecutive observations. The first imminent-collision report dropout is caused by a missed object detection in cycle 925, and a bad object range (~14 cm too long) in cycle 926. A missed detection in cycle 935 caused the latter dropout. These dropouts could be avoided by upgrading trajectory detection to better handle missed detections. There are no more imminent-collision reports after cycle 943 because relative velocity fell below 10 mph.

These imminent-collision reports provide an example of the system and process of the present invention performing as designed and reporting an imminent-collision condition accurately and within the time required to deploy collision-mitigation measures.

What is claimed is:

1. A process of determining an imminent-collision between a vehicle and an object, said vehicle having a sensing system for obtaining position data on at least one observed object within a field of detection, said process comprising:
   (a) obtaining position data on an object within said field of detection;
   (b) determining that said object is likely to be between first and second collision courses when the following two conditions are met, (1) a probability density function value that said object is on said first collision course exceeds a probability density function value of said object being on a first avoidance course, and (2) a probability density function value that said object is on said second collision course exceeds a probability density function value of said object being on a second avoidance course,
   wherein said first avoidance course is on one side of said first and second collision courses, and said second avoidance course is on the other side of said first and second collision courses; and
   (c) providing information to facilitate deployment of collision mitigation measures if said object is determined to be between said first and second collision courses.

2. The process of claim 1, wherein, step (b) comprises determining a first ratio of said probability density function value that said object is on said first collision course to said probability density value that said object is on said first avoidance course and a second ratio of said probability density function value that said object is on said second collision course to said probability density function value that said object is on said second avoidance course and determining that said object is likely to be between first and second collision courses when said first and second ratios are greater than a certain value, said certain value being $1-\alpha)/\beta$, where $\alpha$ is the probability of a missed determination of an imminent collision and $\beta$ is the probability of a false determination of an imminent collision.

3. The process of claim 2, wherein said certain value is about 80000.

4. The process of claim 1, wherein said determination is made based on a position data of a single observation.

5. The process of claim 1, wherein step (b) is performed using position data from a sequence of observations.

6. The process of claim 1, wherein step (b) is performed before determining target parameters of said object.

7. A process of determining if a collision between a vehicle and an object is imminent, said vehicle having a sensing system for obtaining position data on at least one object within a field of detection, said process comprising:
   (a) obtaining position data for one or more observations of said object;
   (b) determining first and second collision values, said first collision value being based on a first probability density function of said object being on a first collision course based on said position data, and said second collision value being based on a second probability density function of said object being on a second collision course based on said position data, said first and second collision courses defining boundaries of a collision zone;
   (c) determining first and second avoidance values, said first avoidance value being based on a first probability density function that said object is on a first avoidance course based on position data, and said second avoidance value being based on a second probability density function that said object is on a second avoidance course based on said position data, said first avoidance course being the boundary of a safe zone closest to said first collision course and said second avoidance course being the boundary of a second safe zone closest to said second collision course;
   (d) determining that a collision is imminent if the ratio of said first collision value to said first avoidance value is above a first certain number, and if the ratio of said second collision value to said second avoidance is above a second certain number; and
   (e) providing information to facilitate deployment of collision mitigation measures if a collision is determined to be imminent.

8. The process of claim 7, wherein said first and second certain numbers are approximately $(1-\alpha)/\beta$, where $\alpha$ is the probability of a missed determination of an imminent collision and $\beta$ is the probability of a false determination of an imminent collision.

9. The process of claim 8, wherein said certain value is about 80000.

10. The process of claim 9, wherein the probability that said object is actually within a collision zone is greater than about 80% and the probability that the object is actually within a safe zone is less than about 0.001%.

11. The process of claim 7, wherein position data is sequential data obtained for two or more sequential observations.

12. The process of claim 11, wherein determining whether said observed object is an actual object is determined using a retrospective-detection algorithm.

13. The process of claim 11, wherein the likelihood that said observed object is an actual object is determined by comparing said sequential position data to a pattern.

14. The process of claim 13, wherein said pattern is a straight line representing the trajectory of said observed object relative to said vehicle.

15. The process of claim 7, wherein said collision zone and said safe zones are determined independently of the position of said object.

16. The process of claim 15, wherein said collision zone is a course in front of said vehicle and said first safe zone is a certain distance to the left of said collision zone and said second safe zone is a certain distance to the right of said collision zone.

17. The process of claim 7, wherein said collision zone and said safe zones are determined based on the position of said object.

18. The process of claim 17, wherein said collision zone for an object is defined on a first side by said first collision course extending between said object and the rear most portion of said vehicle, and on a second side by said second collision course extending between said object and the forward most portion of said vehicle, and said first safe zone is defined on the first side by said first avoidance course extending between said object and a position a certain distance rearward of said vehicle and said second safe zone is defined on the second side by said second avoidance course extending between said object and a position a certain distance forward of said vehicle.

19. The process of claim 7, wherein step (e) comprises determining one or more target parameters for use in pre-collision preparation.

20. The process of claim 19, wherein step (e) comprises determining one or more of the following target parameters: velocity, direction, and time-to-impact.

21. The process of claim 7, further comprising:
 (f) deploying collision mitigation measures if a collision is determined to be imminent.

22. The process of claim 21, wherein said collision mitigation measures comprise at least one of reversible restraints and pre-triggered airbags.

23. The process of claim 7, wherein said first and second collision courses are left and right boundaries, respectively, of said collision zone.

24. The process of claim 7, wherein step (d) involves using a sequential probability ratio test (SPRT).

* * * * *